No. 720,555. PATENTED FEB. 17, 1903.
J. E. BLAKE.
MOUTHPIECE FOR SMOKING DEVICES.
APPLICATION FILED JAN. 8, 1902.

NO MODEL.

Witnesses:
Chas. H. Baker.
E. C. Duffy

Inventor:
by J. Edgar Blake,
F. G. Stebbins.
Att'y.

UNITED STATES PATENT OFFICE.

JOSEPH EDGAR BLAKE, OF AMESBURY, MASSACHUSETTS.

MOUTHPIECE FOR SMOKING DEVICES.

SPECIFICATION forming part of Letters Patent No. 720,555, dated February 17, 1903.

Application filed January 8, 1902. Serial No. 88,868. (No model.)

*To all whom it may concern:*

Be it known that I, JOSEPH EDGAR BLAKE, a citizen of the United States, residing at Amesbury, in the county of Essex and State of Massachusetts, have invented new and useful Improvements in Mouthpieces for Smoking Devices, of which the following is a specification.

My invention relates to improvements in mouthpieces for smoking devices, such as tobacco-pipes, cigar-holders, and the like; and it consists of a stem formed of a main portion, which may be of hard vulcanized rubber or other suitable substance, and an end portion partly of soft vulcanized rubber, and the disposition and arrangement being such that the soft rubber will be located where the teeth come in contact with the stem while supporting the same.

The accompanying drawings, which form a part of this specification, illustrate two examples of the physical embodiment of my invention constructed according to the best modes I have so far devised for the application of the principle.

Figure 1:
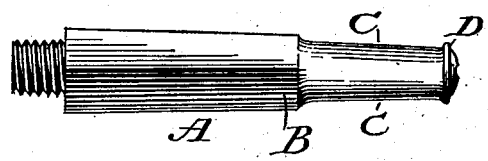
Figure 2:
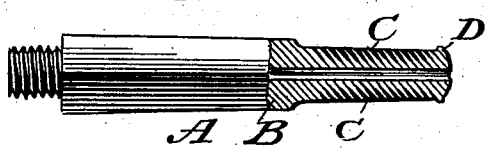
Figure 3:
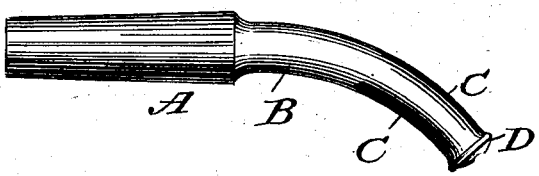

Figure 1 represents a side view of a mouthpiece for a pipe formed by my method of construction. Fig. 2 represents a partial side and partial central longitudinal section of the mouthpiece shown in Fig. 1. Fig. 3 represents a modified form of the mouthpiece, the same being curved and adapted to be secured to the bowl of a pipe and frictionally held in place.

Similar letters indicate like parts throughout the several views.

In Figs. 1 and 2, A designates a mouthpiece for a tobacco-pipe, formed of vulcanized rubber, the main portion B thereof extending the entire length of the piece, as indicated by the lighter portion of the part in section Fig. 2, being vulcanized comparatively hard, so that the shape of the same will be readily maintained, while a small outer portion C, exterior of the portion B, (indicated by dark section lines, Fig. 2,) adjacent the outer end and adapted to be gripped by the teeth of the user, is of comparatively soft vulcanized rubber, so as to be yielding when gripped by the teeth, and thereby avoid injuring the latter and also prevent any breakage of the hard portion. The soft portion is preferably of diminishing thickness measured from the center thereof toward the ends, and the outer end preferably terminates inside the hard vulcanized flanged tip D. By the construction disclosed the shape of the soft portion C is readily maintained in use and service.

In Fig. 3 the end of the mouthpiece is shown as curved and the hard vulcanized portion B and the soft vulcanized portion C are disposed relative to each other in a manner similar to the construction shown by Figs. 1 and 2. The soft vulcanized portion is preferably thicker upon the top and bottom surfaces of the inner hard portion than at the sides and may extend entirely around the same, or the soft portions C C may be separated at their edges by the inner hard portion.

In manufacturing the mouthpiece the main portion is first fashioned to shape and vulcanized. The soft portion is then applied and vulcanized, and finally the entire mouthpiece is polished, the finished article constituting a single permanent construction.

I am aware that it is not new to cover the end of a clay pipe or the stem thereof with a rubber band; but I am not aware that it is old to form a mouthpiece for a stem of a hard inner portion with a soft or yielding outer portion for the teeth terminating within the outer end of the said hard inner portion and said outer portion constituting a permanent part of the mouthpiece and located adjacent the end of the stem; nor am I aware that it is old to form a mouthpiece of integral hard and soft vulcanized rubber.

It is obvious that my method of construction can be employed in the manufacture of pipe-stems or cigar-holders and the like, and I wish to include all such applications of the invention within the scope of my claim.

What I claim as new, and desire to secure by Letters Patent, is—

A mouthpiece for a pipe or cigar-holder comprising a hard, rigid, portion extending the length of the mouthpiece, and soft, yielding vulcanized rubber portions C C located adjacent the free end of the rigid portion, the said portions C C occupying positions upon the upper and lower portions of the stem where they are adapted to be engaged by the teeth.

In testimony whereof I affix my signature in presence of two witnesses.

J. EDGAR BLAKE.

Witnesses:
ANNIE S. WORTHEN,
ROBERT G. PATTEN.